United States Patent Office 2,801,956
Patented Aug. 6, 1957

2,801,956

PROCESS FOR PREPARING PANCREATIC DESOXYRIBONUCLEASE

Werner Baumgarten, North Hills, and Reginald F. Johnson, Willow Grove, Pa., assignors to Merck & Co., Inc., Rahway, N. J., a corporation of New Jersey No Drawing. Application August 24, 1954,
Serial No. 451,975

1 Claim. (Cl. 195—66)

This invention concerns a novel process for preparing pancreatic desoxyribonuclease from beef pancreas.

Pancreatic desoxyribonuclease is used by veterinarians for enzymatic debridement of certain pathologic conditions in animals. These include such diseases as chronic suppurative navel infection, abscesses, wounds, sinusitis, fistulous withers and alveolar periostitis. In the treatment of mastitis of dairy cows, the infusion of pancreatic desoxyribonuclease is particularly applicable since the enzyme liquefies the viscous purulent debris and consequently aids diffusion of other medicinal agents employed in therapy.

A prior art process of extracting pancreatic desoxyribonuclease from beef pancreas is described by McCarty, M., J. Gen. Physiol. 29:128, January 1946. This process, although used, has several disadvantages. The pancreatic desoxyribonuclease recovered contains undesirable impurities and the yield obtained is relatively poor.

Heretofore, a common method of isolating pancreatic desoxyribonuclease was ammonium sulfate fractionation of an aqueous acid extract of bovine pancreas. These extracts of bovine pancreas were produced by first grinding the frozen pancreas glands, immersing the finely ground glands in dilute sulfuric acid, agitating the mixture thoroughly and separating the solids. Ammonium sulfate was then added to the acid mixture and agitation continued. The pH of this extract was about 1.5 to 2.0. The mixture was filtered and the enzyme was isolated from the filtrate by successive fractionation procedures with ammonium sulfate.

In the present procedure the acidified pancreatic suspension is treated with ammonium sulfate, the pH is then adjusted from about 1.0 to 2.5 to about pH 4.0 to 5.0 with aqueous sodium hydroxide. The mixture is then agitated and the solids are separated and discarded. The clear filtrate or centrifugate is collected and the pH is re-adjusted back to about 1.0 to 2.5 with dilute sulfuric acid. Upon standing in the cold, a precipitate forms which is subsequently removed. The resulting clear filtrate is successively precipitated with ammonium sulfate to yield a highly concentrated solution of the enzyme.

The present invention results in a product whose yield and purity is increased about two-fold over that of the McCarty process.

The process for extracting pancreatic desoxyribonuclease from beef pancreas according to the present invention can be generally described as follows:

Frozen beef pancreas are ground in a suitable grinding apparatus and directly added to sufficient cold dilute sulfuric acid such that for every pound of frozen pancreas used there is added one liter of 0.25 N surfuric acid. A pH medium of between 1.0 to 2.5, preferably 1.5, is obtained. The resulting tissue slurry is stirred gently but thoroughly and ammonium sulfate in the ratio of one part solid ammonium sulfate for three parts of frozen beef pancreas is added and gentle stirring is continued for about one hour until the mixture is intimately mixed. The pH of the mixture is adjusted to pH 4 to 5, preferably 4.5, by the addition of dilute base. 50% sodium hydroxide in the ratio of one part aqueous base per 50 or 60 parts 0.25 N sulfuric acid used is generally required. The reason for using dilute base, 50% in this case, is to minimize the exothermic heat of reaction. This mixture is then stored at 2–5° C. for 10 to 30, preferably 24, hours and is then subsequently filtered through de-fattening paper (No. 9767) arranged on glass funnels. The filtration requires 60 to 100 hours.

The filtration is slow but a sparkling clear filtrate results. The precipitate collected on the de-fattening paper is then discarded. The pH of the collected filtrate, still at a temperature of 2–5° C. is re-adjusted to pH 1.0 to 2.5, preferably 1.5, by the slow addition of 20% sulfuric acid. About as much 20% sulfuric acid as 50% sodium hydroxide is used for the re-adjustment. Again, dilute acid is used to avoid exothermic heat of reaction. The re-adjusted solution is then stored at 2–5° C. for 10 to 40, preferably 18, hours. A precipitate forms while standing which settles to the bottom of the container. This precipitate is removed conveniently by any means of centrifugation or filtration and discarded.

Ammonium sulfate, in the ratio of 121 grams of ammonium sulfate per liter of clear filtrate or centrifugate is added and stirred gently until completely dissolved. The resulting solution is stored at 2–5° C. for 10 to 70 hours, preferably 24 hours. Vigorous agitation causes foaming and this should be avoided. The precipitate which forms on standing is separated as by centrifugation and the centrifugate is discarded. The collected precipitate is suspended immediately in from 5 to 15 times its volume of cold distilled water and stirred slowly for one hour. Any undissolved material remaining after one hour is removed as by centrifugation and discarded.

Ammonium sulfate in the ratio of 20.5 ml. of saturated ammonium sulfate solution per liter of centrifugate is added slowly with gentle stirring. Gentle stirring is continued for fifteen minutes during which time complete solution of the ammonium sulfate occurs. The solution is then stored at 2–5° C. for at least 16 hours but not more than 24 hours. A precipitate forms and is separated as by centrifugation and discarded.

Ammonium sulfate in the ratio of 22.5 ml. of saturated ammonium sulfate solution per liter of centrifugate is added slowly with gentle stirring until complete solution occurs in about fifteen minutes. The solution is then stored at 2–5° C. for 10 to 60, preferably 24, hours. The precipitate which forms is collected as by centrifugation and the centrifugate is discarded.

The collected precipitate is suspended in from 5 to 15 times its volume of cold distilled water and slowly stirred until it is dissolved. The pH of the concentrated solution is checked and should be below pH 3.3. If above this value, it should be adjusted with 1 N sulfuric acid to a pH value of 2.75. If the pH is below 3.3, pH adjustment may be postponed until prior to sterile filtration.

This solution is then filled into a cellulose casing and dialyzed against dilute sulfuric acid in the cold. About 20 feet of casing is required per liter of solution to be dialyzed. This allows sufficient space for volume expansion which may vary from 10 to 50%. The dialization is carried on for 50 to 100, preferably 80 hours at 2–5° C. The resulting dialyzed enzyme solution is then diluted to the desired concentration (approximately 200,000 units/ml.) with sterile distilled water and clarified by passing through a No. 3 Horman filter pad. The pad, prior to use, is washed with dilute sulfuric acid, followed by a water wash. This procedure removes the alkaline impurities from the pad so that the enzyme solution maintains a constant acid pH. A sample of the now clarified solution is assayed for potency. Based upon the results of the assay, the concentrated solution is diluted with sterile distilled water to a potency of exactly 25,000 units per ml. and the pH of the solution is adjusted to 2.75 with 1 N sulfuric acid. This solution is now sterilized by filtration through a Columbia filter fitted with three lab. No. 3 pads as described above followed by a pass through a coarse sintered glass filter.

The potency of the sterile bulk should be approximately 25,000 units per ml. in order to allow a fill of 5.0 ml. into each vial. Should there be considerable variation from this value, adjustment should be made for filling more or less volume per vial in order to obtain a fill of approximately 125,000 units per vial.

The sterile solution prepared in this manner is then filled into 10 ml. glass containers (5 ml. of sterile solution per container). The containers are then frozen and lyophilized. The product is thus in the form of a fluffy white powder and merely needs the addition of sterile distilled water or isotonic solution of sodium chloride for reconstitution and subsequent use.

It should be pointed out that the yield of lyophilized pancreatic desoxyribonuclease varies with each lot of beef pancreas. However, with the same lot of beef pancreas comparable yields are obtained. Table I below compares the yields in total units of pancreatic desoxyribonuclease prepared by two methods: the McCarty process adapted for production and applicant's new process.

TABLE I

*Amounts of pancreatic desoxyribonuclease obtained by the two methods starting with aliquots of the same lot of pancreas*

[Yields in total units.]

| Experiment No. | McCarthy Process | Applicant's Process |
| --- | --- | --- |
| 1 | $18.2 \times 10^6$ | $41.4 \times 10^6$ |
| 2 | $7.4 \times 10^6$ | $20.8 \times 10^6$ |
| 3 | $26.6 \times 10^6$ | $52 \times 10^6$ |
| 4 | $20.0 \times 10^6$ | $64.5 \times 10^6$ |
| 5 | $30.0 \times 10^6$ | $49.3 \times 10^6$ |

With respect to product purity the McCarty averaged 30 to 49 units per gamma of nitrogen wihle applicant's process averaged 70 to 110 units per gamma of nitrogen.

The following examples are illustrative of the process of the present invention, but are not to be construed as limiting.

EXAMPLE 1

Three hundred pounds of frozen bovine pancreas are ground through an Enterprise meat grinder using a cone with ¼" perforation. The ground pancreas is collected in a tank containing three hundred liters of cold 0.25 N sulfuric acid. The mixture is stirred gently but thoroughly for about one hour. The pH of this mixture is about 1.5. To the mixture is added 42,900 gm. of solid ammonium sulfate and agitation is continued for an additional hour. The pH is adjusted to 4.5 by the slow addition of 50% sodium hydroxide while agitating the mixture thoroughly but gently. About 5 to 6 liters of 50% sodium hydroxide is required. The mixture is then stored at 2–5° C. for 24 hours.

Keeping the mixture at 2–5° C. it is filtered through defattening paper (No. 9767) in approximately 120 one-gallon conical glass funnels. Each funnel is filled completely once, then no more extract is added. Filtration requires 80 hours. The residue is discarded and the filtrate is retained. The total expected filtrate is between 250 and 300 liters.

The clear filtrate still at a temperature of between 2–5° C. is re-adjusted to pH 1.5 by the slow addition of 20% sulfuric acid. The solution is stirred well but slowly during the addition of the acid. Approximately 5–8 liters of acid is required. The strongly acid solution is then stored for 18 hours at 2–5° C. The precipitate which forms on standing is removed by passing the suspension through a Sharpless centrifuge and discarded.

To the clear centrifugate is added solid ammonium sulfate (121 gm./liter). The salt is stirred gently until completely dissolved. The mixture is then stored for 24 hours at 2–5° C. The precipitate which forms on standing is collected by passing the suspension through a Sharpless centrifuge. The precipitate is removed from the Sharpless bowl, immediately suspended in 9 liters of cold distilled water, stirred slowly for one hour, and the undissolved material removed by centrifugation in a bucket centrifuge.

To the cooled centrifugate is added 20.5 ml. of saturated ammonium sulfate solution per liter of centrifugate. The ammonium sulfate solution is added slowly with gentle stirring. Stirring is contained for 15 minutes. The solution is then stored at 2–5° C. for 18 hours. A small amount of precipitate forms. This is separated by centrifugation in an International centrifuge Model No. 3. The precipitate is discarded and the supernate is retained.

Immediately after centrifugation, to the clear cool supernatant, is added, while stirring, 22.5 ml. of saturated ammonium sulfate per liter of centrifugate. The mixture is stirred 15 minutes, then stored at 2–5° C. for 24 hours. The precipitate which forms is collected in a bucket centrifuge. After the supernate is withdrawn and discarded, the precipitate is suspended in three liters of cold distilled water and stirred until it is dissolved.

The concentrated solution is filled into "Visking cellulose casing 23/32" in diameter. The tubing is suspended in 45 liters of 0.0025 N sulfuric acid and dialyzed for 80 hours at 2–5° C.

A Columbia press is fitted with 17 Lab. No. 3 pads (8" x 8") and sterilized in an autoclave. The pads are then washed with 0.0025 N sulfuric acid using 3 liters per pad, followed by 3 liters of distilled water per pad. The pH of the dialyzed solution is checked and should not be above 3.0. It is then diluted to a pancreatic desoxyribonuclease concentration of approximately 200,000 units/ml. The diluted dialyzed solution is clarified by passing it through the sterile press and the pads washed with distilled water in order to displace the dornase solution from the press. A 5.0 ml. sample of this solution is taken and assayed for potency. Based on the results of the assay, the concentrated solution is diluted with sterile distilled water to a potency of 25,000 units per ml. In addition, the pH of the solution is adjusted to 2.75 with 1 N sulfuric acid. The diluted solution is then sterilized by filtration through a Columbia filter fitted with three Lab. No. 3 pads followed by a coarse sintered glass filter.

As soon as sterility is established, the solution is aseptically dispensed into sterile 10 ml. vials, and plug frozen at −50° F. (−46.2° C.) or lower for 24 hours. The frozen vials are loaded into lyophilization chambers, the shelves of which have been cooled to 35–40° F. by circulation of refrigerated water. When lyophilization has been initiated and a satisfactory vacuum established, the circulation of refrigerated water is discontinued. At the completion of the cycle the vapor valve of the chamber is closed and air is admitted through a dessicant and dry sterile filter arrangement. The containers are stoppered under vacuum. They are individually tested for vacuum by the use of a midget Tesla coil and are capped with an aluminum roll on type closure.

The total yield of dry enzyme recoverable from 300 pounds of fresh beef pancreas is about 75 to 105 grams. In terms of units, which is the only significant measure, this represents about 1,200 million to 1,800 million units.

EXAMPLE II

The same process as Example I, but use fresh bovine pancreas instead of frozen bovine pancreas.

It is to be understood that the invention is not to be limited to the exact details of operation or exact formulation as described, as obvious modifications will be apparent to those skilled in the art, and the invention is therefore to be limited only by the scope of the appended claim.

I claim:

The process of preparing pancreatic desoxyribonuclease from beef pancreas at 2–5° C. which comprises: adding sulfuric acid to ground beef pancreas obtaining thereby a pH of 1.0 to 2.5, adding ammonium sulfate, adjusting the pH from 1.5 to 2.5 to 4 to 5 with dilute base, filtering, re-adjusting the pH of the filtrate from 4 to 5 to 1.5 to 2.5 with dilute sulfuric acid, filtering, adding ammonium sulfate to the filtrate, collecting the precipitate which forms, dissolving the precipitate in distilled water, filtering the resulting solution, adding ammonium sulfate to the filtrate, filtering off the precipitate which forms, adding ammonium sulfate to the filtrate, filtering and collecting the precipitate which forms, dissolving the precipitate in distilled water, dialyzing the resulting solution against dilute sulfuric acid, clarifying and sterilizing the dialyzed enzyme solution by filtration, lyophilization of the sterilized solution to give the enzyme pancreatic desoxyribonuclease as a fluffy white powder.

References Cited in the file of this patent

Kunitz, M.: Jour. Gen. Physiology, 33 (1950), pages 349 to 377.